United States Patent [19]
Ritter et al.

[11] Patent Number: 6,024,403
[45] Date of Patent: Feb. 15, 2000

[54] METHOD FOR CONTROLLING A FOLDING TOP COVERING USING A SUPERIMPOSED MOVEMENT

[75] Inventors: Bernhard Ritter, Pforzheim; Hans-Dieter Dahmen, Neuhausen, both of Germany

[73] Assignee: Dr. Ing. H.C.F. Porsche AG, Germany

[21] Appl. No.: 09/262,021

[22] Filed: Mar. 4, 1999

[51] Int. Cl.⁷ ...................................................... B60J 7/08
[52] U.S. Cl. ...................................... 296/117; 296/107.08
[58] Field of Search ............................... 296/117, 107.08, 296/121

[56] References Cited

U.S. PATENT DOCUMENTS

| | | | |
|---|---|---|---|
| 5,225,747 | 7/1993 | Helms et al. ..................... | 296/107.08 |
| 5,620,226 | 4/1997 | Sauter ............................... | 296/117 |
| 5,825,147 | 10/1998 | Porter et al. ...................... | 296/117 |
| 5,864,214 | 1/1999 | Brodsky ............................. | 296/107.08 |

*Primary Examiner*—Gary C. Hoge
*Attorney, Agent, or Firm*—Evenson McKeown Edwards & Lenahan P.L.L.C.

[57] ABSTRACT

A method controls opening and closing of a folding top of a vehicle. The folding top is openable and closable in a power-operated manner and is placeable in a folding top compartment which can be closed by a lid. In order to shorten the time required for the closing and opening of the folding top, at least the lid for the compartment is moved simultaneously with the folding top.

5 Claims, 3 Drawing Sheets

METHOD FOR CONTROLLING A FOLDING TOP COVERING USING A SUPERIMPOSED MOVEMENT

CROSS-REFERENCE TO RELATED APPLICATION

This application is a related to U.S. application Ser. No. 09/262,020 filed on Mar. 4, 1999, entitled METHOD FOR CONTROLLING AN OPENABLE FOLDING TOP WITH A LOCKING DEVICE and filed in the name of Bernhard Ritter and Hans-Dieter Dahmen.

BACKGROUND OF THE INVENTION

This application claims the priority of German application 198 09 063.3, filed in Germany on Mar. 4, 1998, the disclosure of which is expressly incorporated by reference herein.

The present invention relates to a method for controlling opening and closing a folding top of a vehicle, the folding top being openable and closable in a power-operated manner and being placeable in a folding top compartment which can be closed by a power-operated lid.

German Journal ATZ 91 (1989) Page 314, describes a method for controlling a roof of a vehicle to be opened by providing a sequential course for controlling the folding top as well as a lid for the folding top compartment in which the folding top can be deposited. All movement sequences are consequently carried out successively. The sequential control securely avoids collisions of folding top parts.

SUMMARY OF THE INVENTION

An object of the present invention is to provide a method for controlling a folding top so that the time required for closing and opening of the folding top is shortened without a resulting danger of a collision of folding top parts.

This object has been achieved in accordance with the present invention by providing a method of operation in which at least the lid is moved simultaneously with the folding top. Such a superimposed movement can noticeably reduce the time required for opening or closing the folding top because the sequence of the movement of the roof no longer depends on the movement of the lid but the lid always takes up a position required for the unhindered movement of the folding top.

Thus, before an opening movement of the folding top, a locking device for the releasable connection of the folding top with the windshield frame of the vehicle and a locking device for a locking of the lid on the folding top compartment is unlocked. Subsequently, the folding top and the lid are opened up simultaneously. Both opening movements are carried out completely. After the opening movement of the folding top has been concluded, a closing movement of the lid takes place.

In contrast, the sequence for closing the folding top starts with the unlocking of the locking device of the lid and a complete opening movement of the lid. After the conclusion of the opening movement of the lid, a closing movement of the folding top is initiated. Still during the closing movement of the folding top, a closing movement of the lid is initiated as soon as the folding top is in a defined position. As soon as the closing movements have been concluded, first the locking device of the folding top is locked, and then the locking device of the lid is locked. The locking movements cannot take place simultaneously, particularly when the closing conditions of the lid are used simultaneously for the final tensioning of the folding top since, for a final tensioning of the folding top, this folding top must be fixed on the windshield frame.

Generally speaking, the present invention is based on the recognition that the movement of the folding top and the movement of the lid coincide approximately at the point of the movement sequences in which the folding top reaches the windshield frame. With respect to the opening movement, the opening movement of the lid and the opening movement of the folding top are essentially started simultaneously. With respect to a closing movement of the folding top, the movement sequences of the folding top and the lid are coordinated such that the folding top and the lid essentially reach their closed position simultaneously.

Particularly with respect to the closing movement, a locking of the folding top and of the lid can therefore take place approximately at the same time. Because a switch must be operated by the driver during the entire movement sequence, and the driver normally releases this switch when the locking device of the folding top locks with the windshield frame in an audible manner, the present invention has the special advantage that, because of the close time sequence, the operating duration of the switch lasts beyond the locking of the locking device of the folding top long enough for also securely locking the lid.

The determination of the defined position of the folding top in which a closing movement of the lid 4 starts during a closing operation of the folding top can preferably take place in that, in a learning mode, the control device detects, during a sequence for opening the folding top, the position of the folding top at the moment at which the lid is completely open and stores it as the defined position.

Other objects, advantages and novel features of the present invention will become apparent from the following detailed description of the invention when considered in conjunction with the accompanying drawings.

DETAILED DESCRIPTION OF THE DRAWINGS

Figure 1:
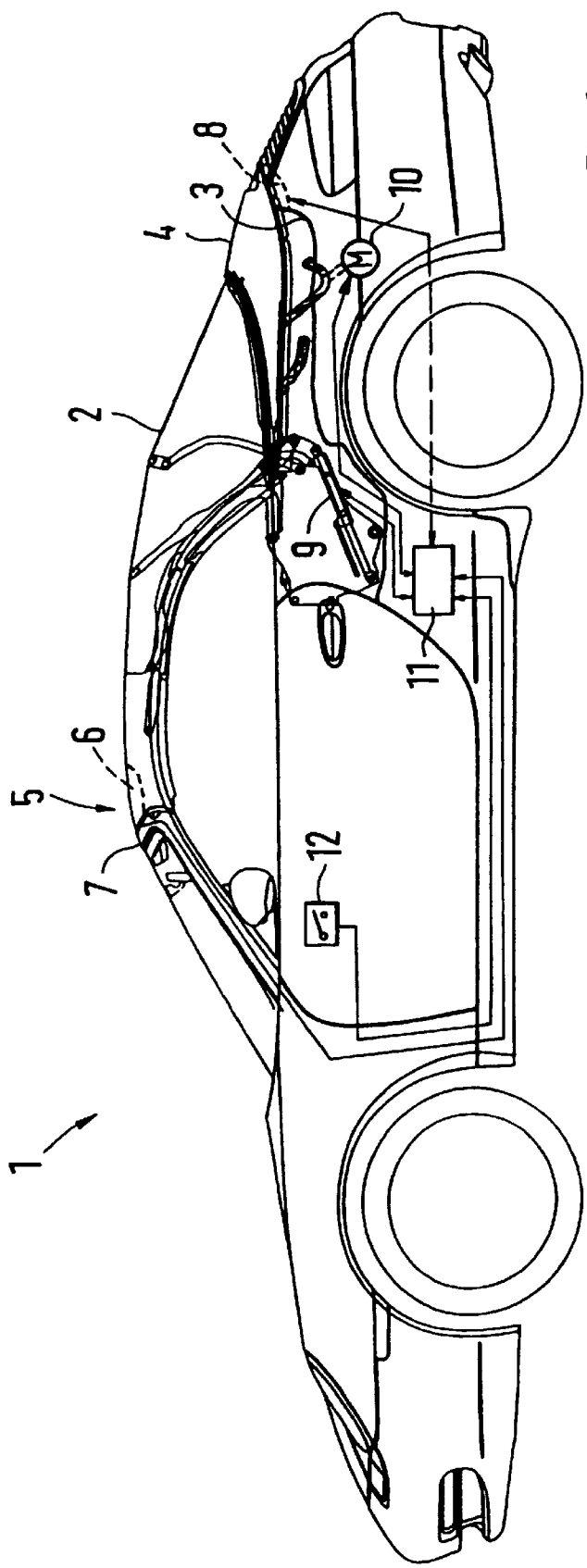
FIG. 1 is a side view of a vehicle with a folding top to be opened and of a folding top compartment which can be closed by a lid and in which the folding top can be deposited.
Figure 2:
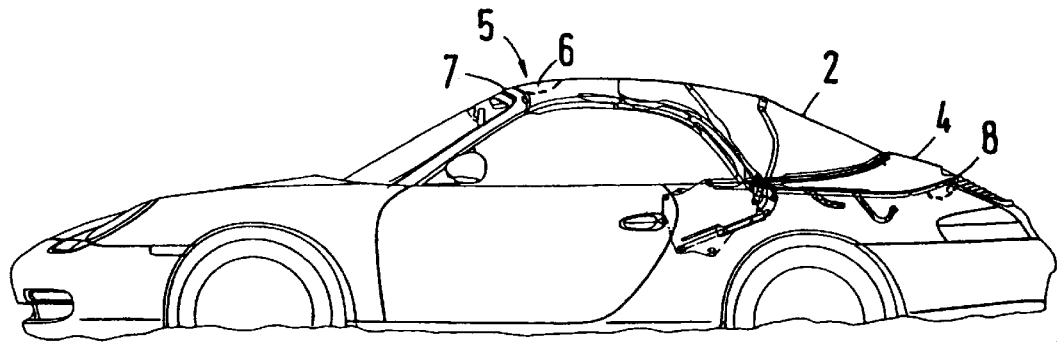
FIGS. 2 to 5 are views of the vehicle of FIG. 1 showing an opening operation of the folding top.

The vehicle 1 illustrated in FIG. 1 has a folding top 2 which can be opened from the illustrated closed condition and can be deposited in a folding top compartment 3. The folding top compartment 3 can be closed by a lid 4. A forward end 5 of the folding top 2 is releasably fixed to the windshield frame 7 of the vehicle 1 by a locking device 6. The lid 7 is releasably fastened on the folding top compartment 3 by a second locking device 8. In addition, a first driving device 9 is used for driving the lid 4, and second driving device 10 is used for driving the folding top 2. Like the locking devices 6, 8, the two driving devices 9, 10 can also be controlled independently of one another by a control unit 11. The control unit 11 is activated by a switch 12 which is provided in the interior of the vehicle so that a driver of the vehicle 1 can arbitrarily trigger the opening and closing of the folding top 2.

In addition to the signal of the switch 12, the control unit 11 receives signals concerning the position of the folding top 2 and of the lid 4 from sensors which are arranged on the driving devices 9, 10. In addition, the locking devices 6, 8 supply signals concerning their locking condition. The locking device 6 supplies a signal which indicates whether the forward end 5 is situated within a distance from the folding top frame 7 to allow the locking device 6 to grip the forward end 5 of the folding top 2.

FIGS. 2 to 5 show the movement sequence of the folding top 2 and of the lid 4. In contrast to the position of the folding top 2 illustrated in a closed position in FIG. 1, in the position according to FIG. 2, the locking devices 6 and 8 have already been released, and the forward end 5 of the folding top 2 is lifted off the windshield frame 7 by the tensioning of the folding top 2. In the closed condition of the folding top 2, this folding top 2 is pretensioned and, for this purpose, is tensioned between the locking devices 6, 8. The sequence of the releasing of the locking devices 6, 8 can basically be selected arbitrarily. For the lifting of the forward end 5, however, it is advantageous to first release the first locking device 6 and thus lift the forward end 5 off the windshield frame 7.

Figure 5:
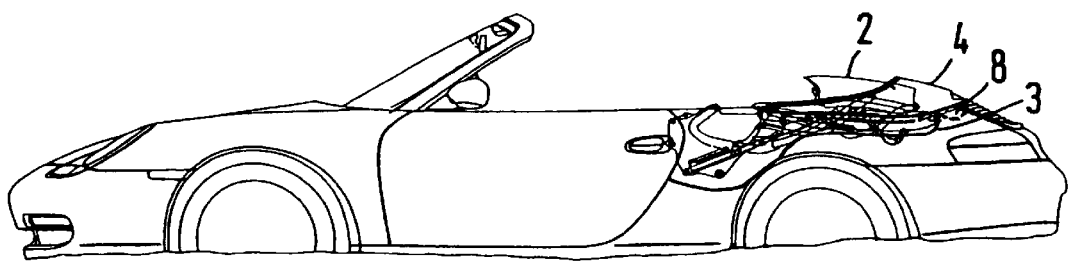

After releasing the locking devices 6, 8, the control unit 11 simultaneously controls the driving devices 9, 10 so that the folding top 2 and the lid 4 simultaneously start an opening movement. In the position shown in FIG. 3, the lid 4 is completely open, while the folding top 2 is still in its opening movement. Furthermore, the lid 4 remains completely open until, in the position illustrated in FIG. 4, the folding top 2 has reached its completely open position and is deposited in the folding top compartment 3. Now, the control unit 11 controls the first driving device 9 in the sense of an opening of the lid 4 and then activates the second locking device 8 so that finally, in the position illustrated In FIG. 5, the roof is completely deposited inside the folding top compartment 3, the lid 4 is closed and the second locking device 8 is locked. FIG. 5 therefore shows the vehicle 1 after the conclusion of all movement sequences for opening the roof 2.

The movement sequence for closing the folding top 2 takes place essentially in reverse order to the previously illustrated opening sequence. First, the second locking device 8 is unlocked and the lid 4 is completely opened before the closing movement of the folding top 2 is started. It is important that, in the position of the folding top 2 illustrated in FIG. 3, which the control unit 11 recognizes by way of the generator mounted on the second driving device 10, the closing movement of the lid 4 is initiated so that the folding top 2 and the lid 4 essentially simultaneously reach their closed position illustrated in FIG. 2 in which, for the conclusion of the movement sequence, only the locking devices 6 and 8 must still be operated. These are now operated successively. First, the first locking device 6 is activated and thus the forward end 5 of the folding top 2 is connected by way of the windshield frame 7, before, as the result of the activation of the second locking device 8, the lid 4 is connected with the locking compartment 3 and, as the result of this movement, the folding top 2 is simultaneously pretensioned.

Figure 6:
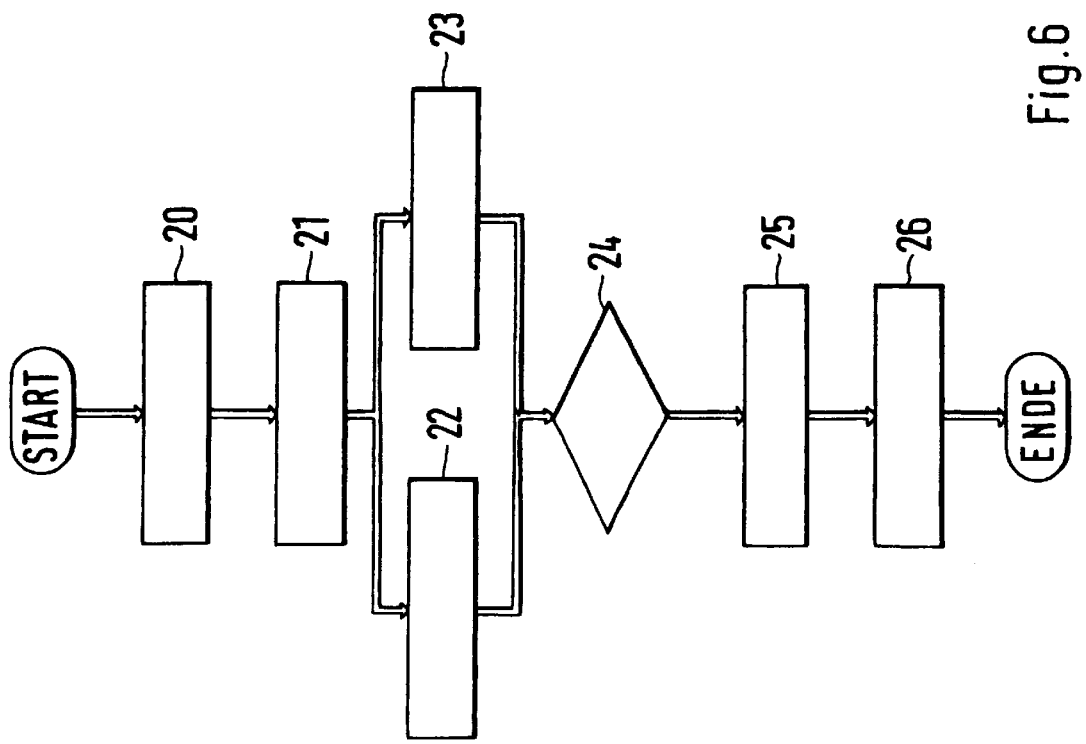
FIG. 6 is a flow chart for the opening operation shown in FIGS. 2 to 5.

FIG. 6 is a flow chart of the sequence for opening the folding top 2. In a first step 20, the locking device 6 is opened up; and in the successive step 21, the locking device 8 is opened up. The sequence is continued only if the respective locking device 6, 8 has reached its end position. This also applies to the further operations of the locking devices 6, 8. Subsequently, step 22, i.e. the opening movement of the lid 4, and step 23, i.e. the opening movement of the folding top 2, are triggered simultaneously. Step 24 waits until the folding top 2 is completely open. In step 25, the closing movement of the lid 4 is triggered and is completely carried out before, in step 26, the locking device 8 is activated and thus the lid 4 is connected with the locking compartment 3. Step 26 concludes the sequence for opening the folding top 2.

Figure 7:
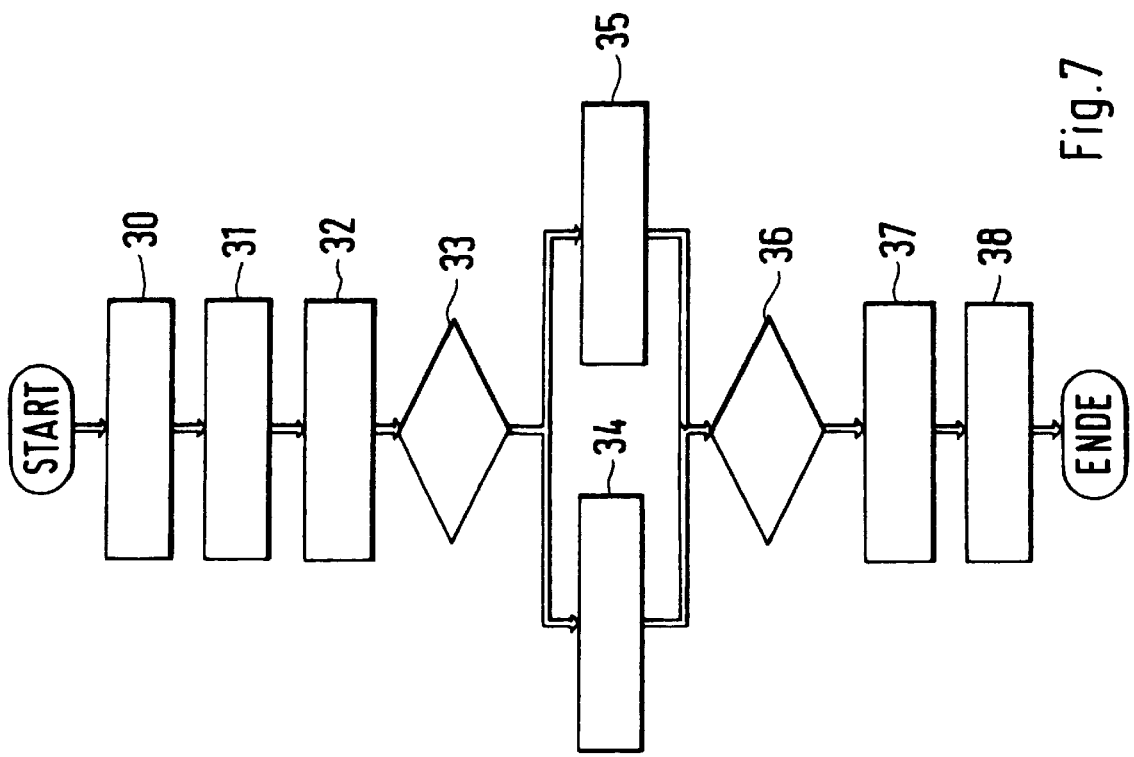
FIG. 7 is a flow chart for a closing operation of the folding top of the vehicle shown in FIG. 1.

FIG. 7 is a flow chart illustrating the sequence for closing the folding top 2. In step 30, the locking device 6 is first unlocked and then, in step 31, the lid 4 is completely opened. After the complete opening of the lid 4, in step 32, the closing movement of the folding top 2 is triggered. In step 33, the system determines whether the folding top 2 has reached its defined position (see FIG. 3). If this is so determined, the closing movement of the lid 4 is triggered and simultaneously, in step 35, the closing movement of the folding top 2 is continued. In fact, no interruption of the closing movement of the folding top 2 takes place between the step 32 and the step 35, but, upon the query in step 33, the closing movement of the lid 4 is additionally initiated in step 34. In step 36, an examination takes place as to whether the folding top 2 and the lid 4 are completely closed, before, in step 37, first the locking device 6 and then, in a successive step 38, the locking device 8 are each operated. Step 38 concludes the sequence for closing the roof 2.

Figure 3:
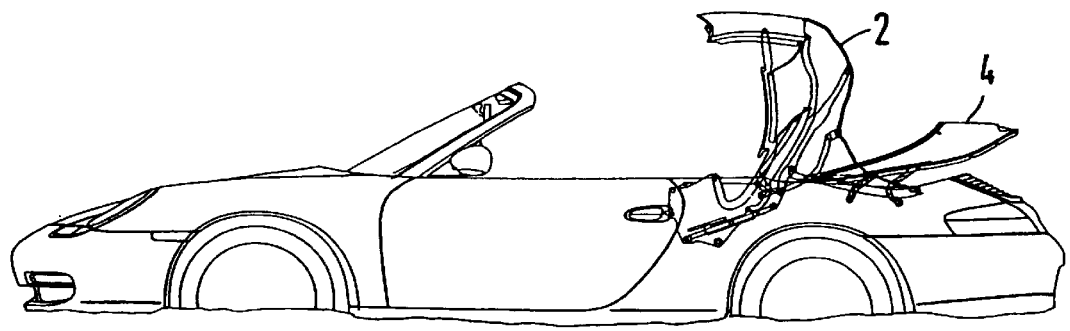
Figure 4:
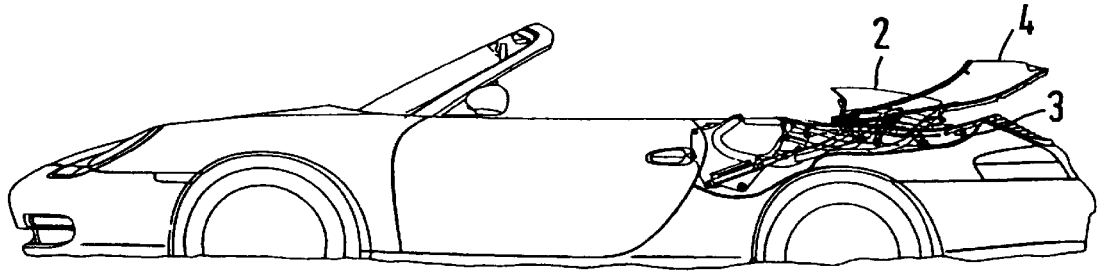

The determination of the position of the roof 2 shown in FIG. 3, in which a closing movement of the lid 4 ends simultaneously with a closing movement of the folding top 2, can take place, for example, by using a learning mode. That is, the control unit 11, during a sequence for opening the folding top 2, detects the position of the folding top 2, which is supplied by the generator on the driving device 10, at the moment at which the generator arranged on the first driving device 9 indicates the complete opening of the lid 4. The control unit 11 stores this position and uses it subsequently during a closing of the folding top 2 in step 33 shown in FIG. 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling opening and closing of a power-operated folding top of a vehicle, comprising the steps of initiating operation of the folding top, and simultaneously moving a power-operated lid configured to close a folding top compartment for receiving the folding top.

2. The method according to claim 1, wherein with the initiation of the operation of the folding top for opening thereof, a locking device is unlocked for the releasable connection of the folding top with a windshield frame, the lid is unlocked when the locking device is released, the lid and the folding top are simultaneously opened when the lid is unlocked, and the lid is closed when the folding top is in a completely open position.

3. The method according to claim 1, wherein with the initiation of the operation of the folding top for closing thereof, unlocking and opening of the lid occurs, a closing movement of the folding top is triggered when the lid is open, the lid is closed when the folding top is in a defined position, a locking device is locked for the releasable connection of the folding top with a windshield frame, and the lid is locked.

4. The method according to claim 3, wherein the defined position of the folding top is determined such that the folding top and the lid reach their closed position essentially simultaneously.

5. The method according to claim 4, wherein the defined position of the folding top is determined by the folding top and the lid starting their respective opening operation essentially simultaneously, and the actual position of the folding top is stored as a defined position when the lid reaches a completely open position.

* * * * *